United States Patent
Iwashita et al.

(10) Patent No.: US 11,443,210 B2
(45) Date of Patent: Sep. 13, 2022

(54) PREDICTING METHOD, PREDICTING APPARATUS, AND COMPUTER-READABLE RECORDING MEDIUM

(71) Applicant: FUJITSU LIMITED, Kawasaki (JP)

(72) Inventors: Hiroaki Iwashita, Tama (JP); Takuya Takagi, Kawasaki (JP); Keisuke Goto, Kawasaki (JP); Kotaro Ohori, Chuo (JP)

(73) Assignee: FUJITSU LIMITED, Kawasaki (JP)

( * ) Notice: Subject to any disclaimer, the term of this patent is extended or adjusted under 35 U.S.C. 154(b) by 300 days.

(21) Appl. No.: 16/900,148

(22) Filed: Jun. 12, 2020

(65) Prior Publication Data

US 2021/0004697 A1 Jan. 7, 2021

(30) Foreign Application Priority Data

Jul. 1, 2019 (JP) .............................. JP2019-123218

(51) Int. Cl.
  *G06F 15/16* (2006.01)
  *G06N 5/04* (2006.01)
  *G06N 20/00* (2019.01)
(52) U.S. Cl.
  CPC ............... *G06N 5/04* (2013.01); *G06N 20/00* (2019.01)
(58) Field of Classification Search
  CPC .................................. G06N 5/04; G06N 20/00
  USPC ........................................................ 709/200
  See application file for complete search history.

(56) References Cited

U.S. PATENT DOCUMENTS

| 6,973,446 | B2 | 12/2005 | Mamitsuka et al. |
| 7,603,330 | B2 * | 10/2009 | Gupta .................. G06N 3/0454 706/20 |
| 10,713,591 | B2 * | 7/2020 | Gangadharappa ....... G06N 5/04 |
| 11,164,086 | B2 * | 11/2021 | Tian ....................... G06N 5/003 |

(Continued)

OTHER PUBLICATIONS

Chen, J et al: "A new method for learning pseudo-Boolean functions with applications in terrorists profiling"; Cybernetics and Intelligent Systems, 2004 IEEE Conference on Singapore Dec. 1-3, 2004; IEEE, Piscataway, NJ, USA, vol. 1 Dec. 1, 2004; pp. 234-239, XP010811612, (6 pages).

(Continued)

*Primary Examiner* — Moustafa M Meky
(74) *Attorney, Agent, or Firm* — Staas & Halsey LLP

(57) ABSTRACT

A non-transitory computer-readable recording medium stores therein a predicting program that causes a computer to execute: receiving input data to be subjected to prediction; and generating, from training data sets each having explanatory variables and an objective variable, a prediction result, by using a hypothesis set and respective weights of hypotheses included in the hypothesis set, the hypotheses each being formed of a combination of the explanatory variables, classifying any of the training data sets and satisfying a specific condition, the weights being learnt based on whether each of the hypotheses holds true for each of the training data sets. The generating includes determining a value of a variable included in a pseudo-Boolean function such that a probability satisfies a predetermined standard, the probability being a probability that the prediction result satisfies the specific condition, the pseudo-Boolean function including variables corresponding to the explanatory variables.

12 Claims, 16 Drawing Sheets

(56) References Cited

U.S. PATENT DOCUMENTS

| | | | | |
|---|---|---|---|---|
| 2002/0184169 A1* | 12/2002 | Opitz | ............ | G06N 20/00 |
| | | | | 706/20 |
| 2007/0203863 A1* | 8/2007 | Gupta | ............ | G06N 3/0454 |
| | | | | 706/20 |
| 2009/0144209 A1* | 6/2009 | Miyakawa | ............ | G16B 40/00 |
| | | | | 707/999.102 |
| 2018/0032906 A1* | 2/2018 | Gangadharappa | ..... | G06N 5/025 |
| 2019/0172564 A1* | 6/2019 | Chandra | ............ | G06F 16/24522 |
| 2020/0012948 A1* | 1/2020 | Tian | ............ | G06N 5/003 |
| 2020/0151610 A1* | 5/2020 | Chueh | ............ | G06K 9/6292 |

OTHER PUBLICATIONS

Extended European Search Report dated Jan. 12, 2021 in related European Patent Application No. 20180724.5 (10 pages).

Leo Breiman, "Random Forests"; Statistics Department, University of California, Berkeley, CA 94720; Machine Learning, 45, 5-32, 2001; (28 pages).

\* cited by examiner

FIG.3

|   | $\bar{C}\bar{D}$ | $\bar{C}D$ | $CD$ | $C\bar{D}$ |
|---|---|---|---|---|
| $\bar{A}\bar{B}$ |   |   |   | $N_1$ |
| $\bar{A}B$ | $P_1$ |   | $P_2$ |   |
| $AB$ |   | $P_4$ | $N_3$ |   |
| $A\bar{B}$ |   | $P_3$ |   | $N_2$ |

FIG.8

FIG.9
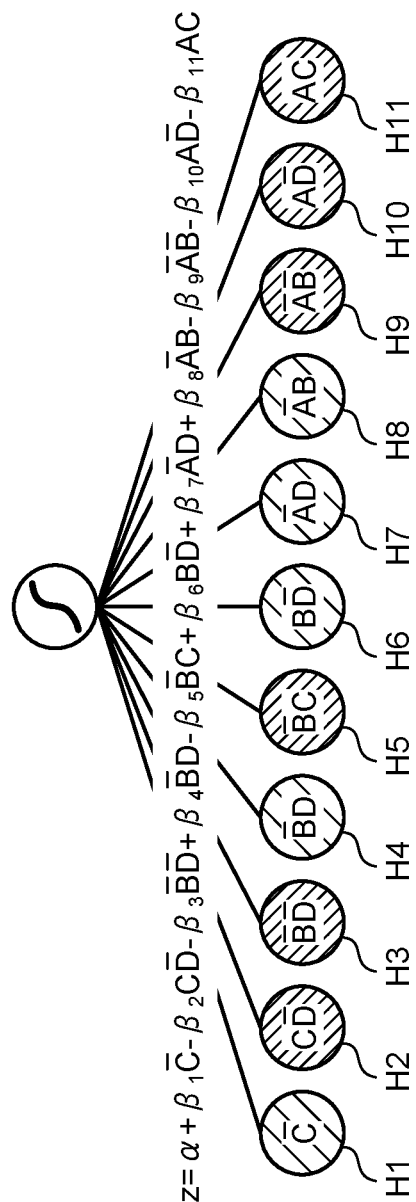
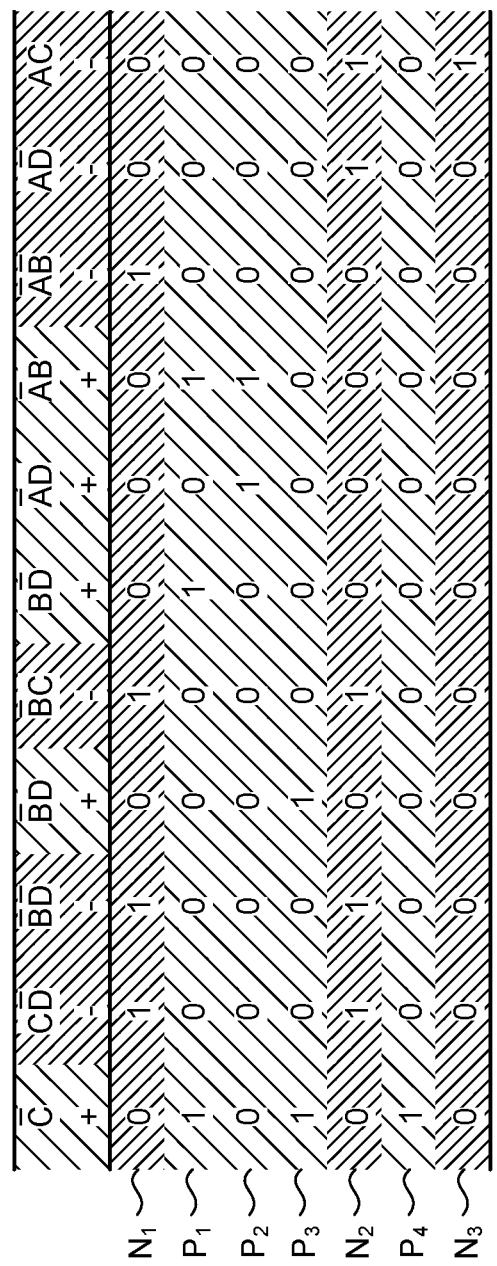

FIG.12

```
findMax(f,m):
    RETURN IF maxval[f] HAS BEEN SET
    maxval[f]←-∞, assign[f]←{}
    RETURN IF UPPER BOUND OF f IS m OR LESS
    SET f FOR maxval[f] AND RETURN IF f IS A CONSTANT
    SELECT x THAT IS ONE OF VARIABLES INCLUDED IN f
    FIND FUNCTION $f_0$ RESULTING FROM SUBSTITUTION OF x = 0 INTO
    f AND FUNCTION $f_1$ RESULTING FROM SUBSTITUTION OF x = 1 INTO f
    for a ∈ {0,1}:
        findMax($f_a$,m)
        if m<maxval[$f_a$]:
            m←maxval[f]←maxval[$f_a$]
            assign[f]←assign[$f_a$] ∪ {(x,a)}
```

PREDICTING METHOD, PREDICTING APPARATUS, AND COMPUTER-READABLE RECORDING MEDIUM

CROSS-REFERENCE TO RELATED APPLICATION

This application is based upon and claims the benefit of priority of the prior Japanese Patent Application No. 2019-123218, filed on Jul. 1, 2019, the entire contents of which are incorporated herein by reference.

FIELD

The embodiments discussed herein are related to a predicting program, a predicting method, and a predicting apparatus.

BACKGROUND

Some techniques used for non-linear classification of discrete data include a technique for predicting a result of classification of input data by: machine learning for acquisition of a classification rule, that is, a decision tree used for classification of data, the machine learning being performed by use of supervised training data; and use of the decision tree acquired by the machine learning.

Non-Patent Document 1: L. Breiman, "Random Forests", Machine Learning, vol. 45, pp. 5-32 (2001)

One of aims of prediction for input data is to determine (or predict) an optimum action (for example, how to control a subsequent step to be performed in a manufacturing process or how to make subsequent approaches to clients to be subjected to marketing) by use of a classification rule.

SUMMARY

According to an aspect of an embodiment, a non-transitory computer-readable recording medium stores therein a predicting program that causes a computer to execute a process including: receiving input data to be subjected to prediction; and generating, from training data sets each having explanatory variables and an objective variable, a prediction result using the input data, by using a hypothesis set and respective weights of a plurality of hypotheses included in the hypothesis set, the hypothesis set including the hypotheses each being formed of a combination of the explanatory variables, classifying any of the training data sets and satisfying a specific condition, the weights being obtained by machine learning based on whether or not each of the hypotheses included in the hypothesis set holds true for each of the training data sets. The generating includes determining a value of a variable included in a pseudo-Boolean function such that a probability satisfies a predetermined standard, the probability being a probability that the prediction result using the input data satisfies the specific condition, the probability being calculated by the pseudo-Boolean function generated as a result of the machine learning, the pseudo-Boolean function including variables corresponding to the explanatory variables and used in calculation of a probability that the specific condition is satisfied.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is an explanatory diagram illustrating an example of training data;

FIG. 8 is an explanatory diagram for explanation of hypotheses matching input data;

FIG. 9 is an explanatory diagram for explanation of weighting by logistic regression;

FIG. 12 is an explanatory diagram exemplifying an algorithm for a findMax function;

DESCRIPTION OF EMBODIMENTS

However, plural classification rules may be generated for prediction. Therefore, according to the above mentioned conventional technique, all actions respectively based on plural classification rules will be attempted when an optimum action is to be predicted, and there is thus a problem that the cost of the processing is increased.

Accordingly, it is an object in one aspect of an embodiment of the invention to provide a predicting program, a predicting method, and a predicting apparatus that enable efficient prediction for input data.

Preferred embodiments of the present invention will be explained with reference to accompanying drawings. For the embodiment, like reference signs will be assigned to components having like functions, and redundant description thereof will be omitted. The predicting program, the predicting method, and the predicting apparatus according to the embodiment described hereinafter are just examples, and do not limit the embodiment. Furthermore, embodiments may be combined with one another as appropriate so long as no contradiction is caused by the combination.

Figure 1:
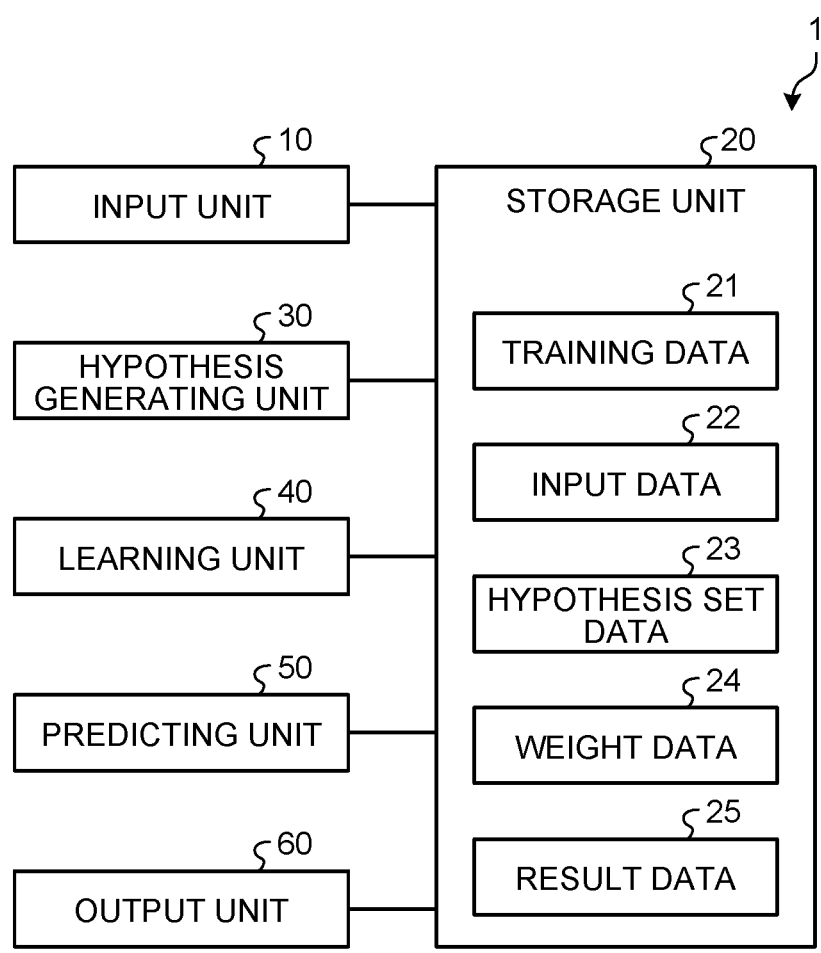
FIG. 1 is block diagram illustrating an example of a functional configuration of an information processing apparatus according to an embodiment.

FIG. 1 is block diagram illustrating an example of a functional configuration of an information processing apparatus according to an embodiment.

As illustrated in FIG. 1, an information processing apparatus 1 has an input unit 10, a storage unit 20, a hypothesis generating unit 30, a learning unit 40, a predicting unit 50, and an output unit 60.

The input unit 10 is a processing unit that receives input of various data, such as training data 21 related to machine learning and input data 22 to be subjected to prediction. The input unit 10 stores the training data 21 and input data 22 that have been received, into the storage unit 20.

The storage unit 20 stores therein various data, such as, for example, the training data 21, the input data 22, hypothesis set data 23, weight data 24, and result data 25.

The hypothesis generating unit 30 comprehensively searches for hypotheses (rules (reasons) each explaining that prediction made is in accordance with an objective variable), the hypotheses each being formed of a combination of explanatory variables, from the training data 21 including data sets each having explanatory variables and an objective variable.

Subsequently, based on the explanatory variables and objective variable in the training data 21, the hypothesis generating unit 30 determines a hypothesis that classifies any of the training data 21 and satisfies a specific condition, from the hypotheses retrieved. This specific condition is, for example, that the number or proportion of the data sets of the training data 21 classified into a predetermined class according to a rule indicated by the hypothesis (a combination of explanatory variables) is equal to or greater than a predetermined value. For example, from the hypotheses retrieved, the hypothesis generating unit 30 determines a hypothesis explaining, with a certain number or more of samples and (or) a certain proportion or more of samples, that the number or proportion of the data sets of the training data 21 classified by that hypothesis is equal to or greater than a predetermined value and that results of the classification according to the hypothesis belong to a certain class. That is, the hypothesis generating unit 30 determines a hypothesis potentially explaining correctly that prediction made will be in accordance with the objective variable of the training data 21.

Subsequently, the hypothesis generating unit 30 adds the hypothesis determined, to a hypothesis set. Accordingly, the hypothesis generating unit 30 enumerates, in the hypothesis set, hypotheses potentially explaining correctly that prediction made will be in accordance with the objective variable of the training data 21. Subsequently, the hypothesis generating unit 30 stores the hypothesis set data 23 representing the hypothesis set having the hypotheses enumerated therein, into the storage unit 20.

The learning unit 40 performs, based on whether or not each of the plural hypotheses included in the hypothesis set of the hypothesis set data 23 holds true for each data set of the training data 21, machine learning for calculation of respective weights of the plural hypotheses. The learning unit 40 stores the respective weights of the plural hypothesis into the storage unit 20, the respective weights having been acquired as a result of the machine learning and serving as the weight data 24. The hypothesis set data 23 and weight data 24 acquired as described above serve as a prediction model for acquisition of a prediction result.

The predicting unit 50 is a processing unit that generates a prediction result, based on the input data 22 that are subjected to prediction, by using the hypothesis set according to the hypothesis set data 23 and the weights of the plural hypotheses according to the weight data 24, that is, by using the prediction model. The predicting unit 50 stores the generated prediction result as the result data 25, into the storage unit 20.

The input data 22 include, for example, a known action (a part of explanatory variables) and a label targeted (an objective variable). For an unknown action (the remaining explanatory variables), the predicting unit 50 predicts optimum values for the explanatory variables, that is, an optimum action, after execution of the known action, by using the prediction model, the optimum values resulting in the label targeted.

For example, if how a step performed subsequently is to be controlled is predicted for manufacture of a non-defective product in a manufacturing process, a known action included in the input data 22 may be observed values in the manufacturing process or set values for control. Furthermore, the label targeted may indicate that a product manufactured by the manufacturing process is a non-defective product. As a result, how control of the process to be performed subsequently for the manufacture of a non-defective product (an unknown action) is to be performed is able to be predicted.

Furthermore, if, for example, how approaches to clients are made next for success of marketing is to be predicted, a known action included in the input data 22 may be the content of response to users in the marketing. The label targeted may indicate that the marketing will be successful. As a result, the predicting unit 50 is able to predict how the approaches to clients (an unknown action) are made next for the marketing to be successful.

Specifically, the predicting unit 50 predicts, based on the hypotheses in the hypothesis set according to the hypothesis set data 23 and the prediction model according to the weights of the hypotheses represented by the weight data 24, an optimum action (unknown values of the explanatory variables) by application of values included in the input data 22 (a part of the explanatory variables and the objective variable).

For the prediction model, a score function for finding a probability (a prediction score) that a specific condition (a label) is satisfied is expressed by a pseudo-Boolean function. By using the fact that the score function is expressed by the pseudo-Boolean function, the predicting unit 50 determines a variable (an unknown variable) included in the pseudo-Boolean function such that the probability that a condition included in the input data 22 is satisfied fulfills a predetermined standard corresponding to the objective variable (such that the label corresponding to the objective variable is acquired).

Use of the fact that the score function is the pseudo-Boolean function has advantages including that determination of an equivalent state is possible, calculation of a lower bound and an upper bound is facilitated, and an existing technique (Endre Boros and Peter L. Hammer, "Pseudo-Boolean optimization", Discrete Applied Mathematics, Vol. 123, Issues 1-3, pp. 155-225, 2002) related to pseudo-Boolean functions is applicable. Therefore, use of the fact that a prediction score (which may hereinafter be referred to as a "score") is expressed by a pseudo-Boolean function enables more efficient prediction than when all actions are attempted one by one.

The output unit 60 is a processing unit that reads the result data 25 stored in the storage unit 20 and that outputs the result data 25 to a display and/or a file. The information processing apparatus 1 thereby outputs the prediction result predicted by the predicting unit 50, to the display and/or file.

The information processing apparatus 1 is an example of a learning apparatus and a predicting apparatus. This embodiment exemplifies a configuration where the single information processing apparatus 1 performs both machine learning and prediction, but the machine learning and prediction may be implemented by separate information processing apparatuses 1.

Figure 2:
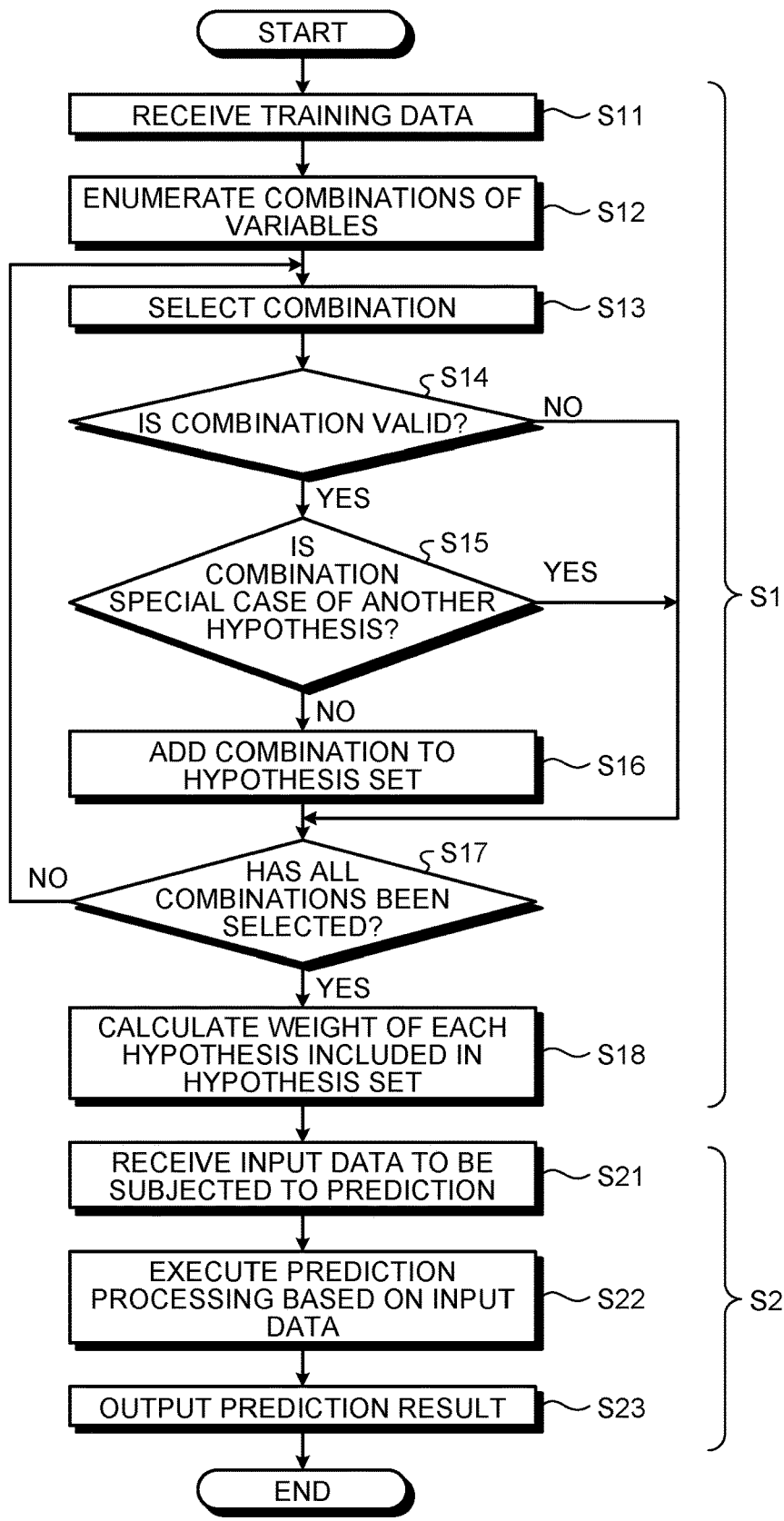
FIG. 2 is a flow chart illustrating an example of operation of the information processing apparatus according to the embodiment.

Next, processing by each of the above mentioned functional units will be described in detail while an example of operation of the information processing apparatus 1 is described. FIG. 2 is a flow chart illustrating an example of operation of the information processing apparatus 1 according to the embodiment.

As illustrated in FIG. 2, the operation of the information processing apparatus 1 includes: operation (S1) at the time of machine learning for generation of a prediction model; and operation (S2) at the time of prediction for acquisition of a prediction result by application of the generated prediction model to the input data 22 to be subjected to the prediction. The operation (S1) at the time of machine learning will be described firstly.

As illustrated in FIG. 2, as processing is started, the input unit 10 receives input of training data (S11), and stores the training data 21 into the storage unit 20.

FIG. 3 is an explanatory diagram illustrating an example of training data. The training data 21 are sets of supervised data respectively corresponding to plural cases, and include explanatory variables A to D explaining characteristics of the data and an objective variable that is a result of classification to "+" or "−" (correct answer information).

As illustrated in FIG. 3, training data sets ($P_1$ to $P_4$ and $N_1$ to $N_3$) include explanatory variables A to D explaining characteristics of the data (information used in prediction) and an objective variable that is correct answer information (information to be predicted) indicating a class "+" or "−". For example, the training data $P_1$ to $P_4$ are data sets having the explanatory variables A to D each of which is either 0 or 1 and is classified as "+". Similarly, the training data $N_1$ to $N_3$ are data sets having the explanatory variables A to D each of which is either 0 or 1 and is classified as "−".

For example, for the training data sets ($P_1$ to $P_4$ and $N_1$ to $N_3$) for generation of a prediction model that classifies results (non-defective products/defective products) for manufactured products from data on a process in the field of manufacturing processes, the explanatory variables A to D correspond to observed values and control values for each process. Furthermore, the objective variable corresponds to results of manufacture, such as non-defective products/defective products.

The explanatory variables (I/O) are expressed by presence or absence of an overline (hereinafter, referred to as a "bar"). For example, "A" represents "A=1", and "A-bar" represents "A=0". Furthermore, the objective variable (+/−) is expressed by hatching. For example, the hatching for the training data $P_1$ to $P_4$ represents that the objective variable is "+". Furthermore, the hatching for the training data $N_1$ to $N_3$ represents that the objective variable is "−". These representations are common to the other drawings too.

Subsequently, the hypothesis generating unit 30 comprehensively enumerates hypotheses that are combinations of values (not used=*, value=1, and value=0) that the explanatory variables included in the training data sets ($P_1$ to $P_4$ and $N_1$ to $N_3$) may have (S12).

Limitation (a condition) may be provided for the number of explanatory variables to be combined, such that the number of explanatory variables becomes equal to or less than a predetermined number. For example, for the four explanatory variables A to D, the number of explanatory variables to be combined may be limited to be two or less (such that at least two explanatory variables that are "not used=*" are combined, among the four explanatory variables). As a result, the combinations are each prevented from becoming too large.

Subsequently, the hypothesis generating unit 30 selects a predetermined combination from the combinations enumerated at S12 (S13). Next, based on the explanatory variables and the objective variable of the training data sets ($P_1$ to $P_4$ and $N_1$ to $N_3$), the hypothesis generating unit 30 then determines whether or not the combination selected is a valid combination that classifies any of the training data sets ($P_1$ to $P_4$ and $N_1$ to $N_3$) and satisfies a specific condition (S14).

Figure 4:
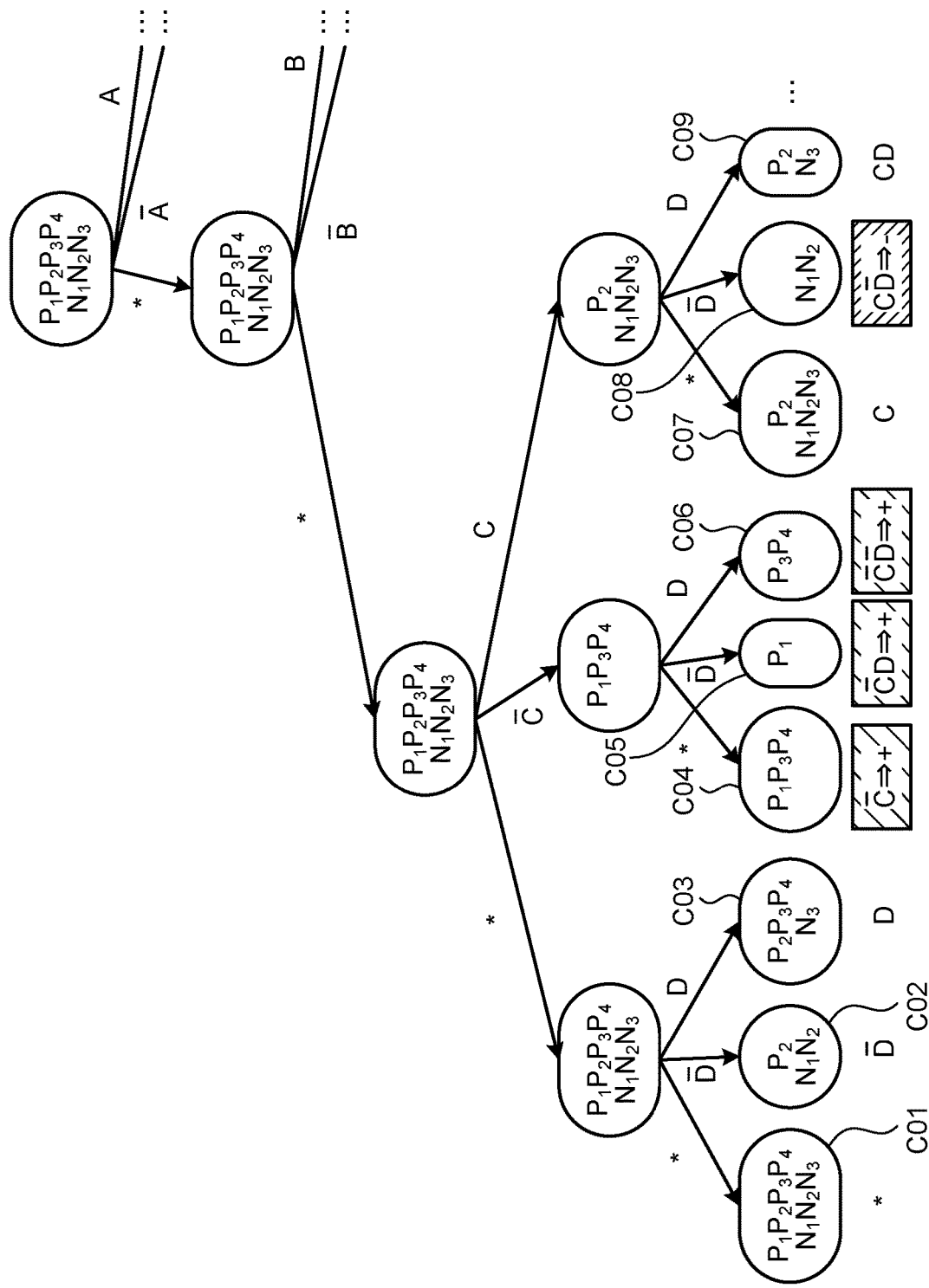
FIG. 4 is an explanatory diagram for explanation of generation of hypotheses.

FIG. 4 is an explanatory diagram for explanation of generation of hypotheses. FIG. 4 illustrates, as an example, a combination C01 with all of the four explanatory variable A to D being "*" to a combination C09 of C and D (where A and B are "*").

As illustrated in FIG. 4, based on the explanatory variables of the training data sets ($P_1$ to $P_4$ and $N_1$ to $N_3$), the hypothesis generating unit 30 enumerates the training data sets ($P_1$ to $P_4$ and $N_1$ to $N_3$) corresponding to the respective hypotheses (rules) of the combinations C01 to C09.

For example, the training data sets $P_2$, $N_1$, and $N_2$ correspond to the rule of the "D-bar" of the combination C02 (where the remaining three explanatory variables are "not used=*"). For this rule (D-bar) of the combination C02, both the training data set ($P_2$) with the objective variable being "+" and the training data sets ($N_1$ and $N_2$) with the objective variable being "−" are present. Therefore, the combination C02 is not likely to be a hypothesis correctly explaining classification into a class, and is not a valid combination.

The training data sets ($P_1$, $P_3$ and $P_4$) with the objective variable being "+" correspond to the rule (C-bar) of the combination C04. That is, the number or proportion of the training data sets ($P_1$, $P_3$ and $P_4$) classified into the class "+" is equal to or greater than a predetermined value, and the combination C04 is thus likely to be a rule correctly explaining classification into the class "+". Therefore, the hypothesis generating unit 30 determines that the combination C04 (C-bar) is a valid combination (hypothesis) for classification into the class "+". Similarly, the hypothesis generating unit 30 determines that the combinations C05 and C06 are also valid combinations (hypotheses) for classification into the class "+".

Furthermore, the training data sets ($N_1$ and $N_2$) with the objective variable being "−" correspond to the rule (C and D-bar) of the combination C08. That is, the number or proportion of the training data sets ($N_1$ and $N_2$) classified into the class "−" is equal to or greater than a predetermined value, and the combination C08 is likely to be a rule correctly explaining classification into the class "−". Therefore, the hypothesis generating unit 30 determines that the combination C08 (C and D-bar) is a valid combination for classification into the class "−".

The number or proportion of the training data sets ($P_1$ to $P_4$ and $N_1$ to $N_3$) classified into a predetermined class may be arbitrarily set, the number or proportion serving as a condition for determination as a valid combination. For example, since training data may have noise mixed therein, a certain number may be set to be allowed for a class (for example, "−") opposite to a certain class (for example, "+").

For example, if noise worth one training data set is to be allowed, the combination C03 (D) is determined to be a valid combination (hypothesis) for classification into the class "+". Similarly, the combination C07 (C) is determined to be a valid combination (hypothesis) for classification into the class "−".

As illustrated in FIG. 2, if the combination is not valid (S14: No), the hypothesis generating unit 30 advances the processing to S17 without adding the selected combination to a hypothesis set.

If the combination is valid (S14: Yes), the hypothesis generating unit 30 determines whether or not the selected combination is a special case of another hypothesis included in the hypothesis set (S15).

For example, C-bar and D of the combination C05 and C-bar and D-bar of the combination C06 are each made by addition of a new literal to the C-bar of the combination C04. The hypothesis generating unit 30 determines that these combinations C05 and C06 are special cases of C-bar of the combination C04.

If the combination is a special case (S15: Yes), the hypothesis generating unit 30 advances the processing to S17 without adding the selected combination to the hypothesis set.

Figure 5:
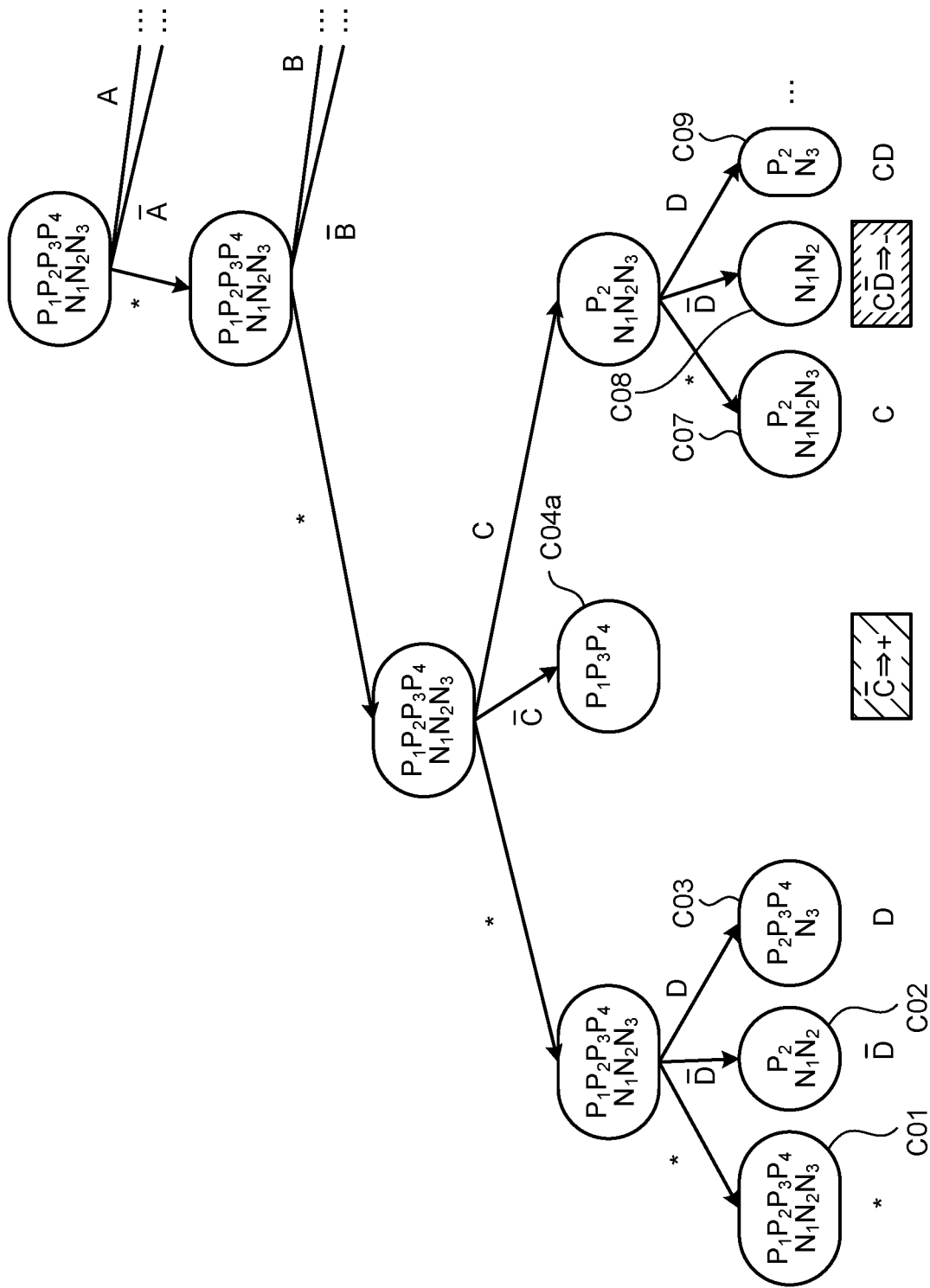
FIG. 5 is an explanatory diagram for explanation of generation of hypotheses.

FIG. 5 is an explanatory diagram for explanation of generation of hypotheses. As illustrated in FIG. 5, the hypothesis generating unit 30 omits combinations (the combinations C05 and C06) that are special cases of C-bar, and leaves the combination C04a of C-bar in the hypothesis set.

If the combination is not a special case (S15: No), the hypothesis generating unit 30 adds the selected combination to the hypothesis set of the hypothesis set data 23 (S16). Subsequently, the hypothesis generating unit 30 determines whether or not all of the combinations enumerated at S12 have been selected (S17). If there is any combination that has not been selected (S17: No), the hypothesis generating unit 30 returns the processing to S13.

By repeating the processing from S13 to S17, the hypothesis generating unit 30 fully enumerates, into the hypothesis set, hypotheses potentially explaining correctly that prediction will be in accordance with the objective variable of the training data 21.

Figure 6:
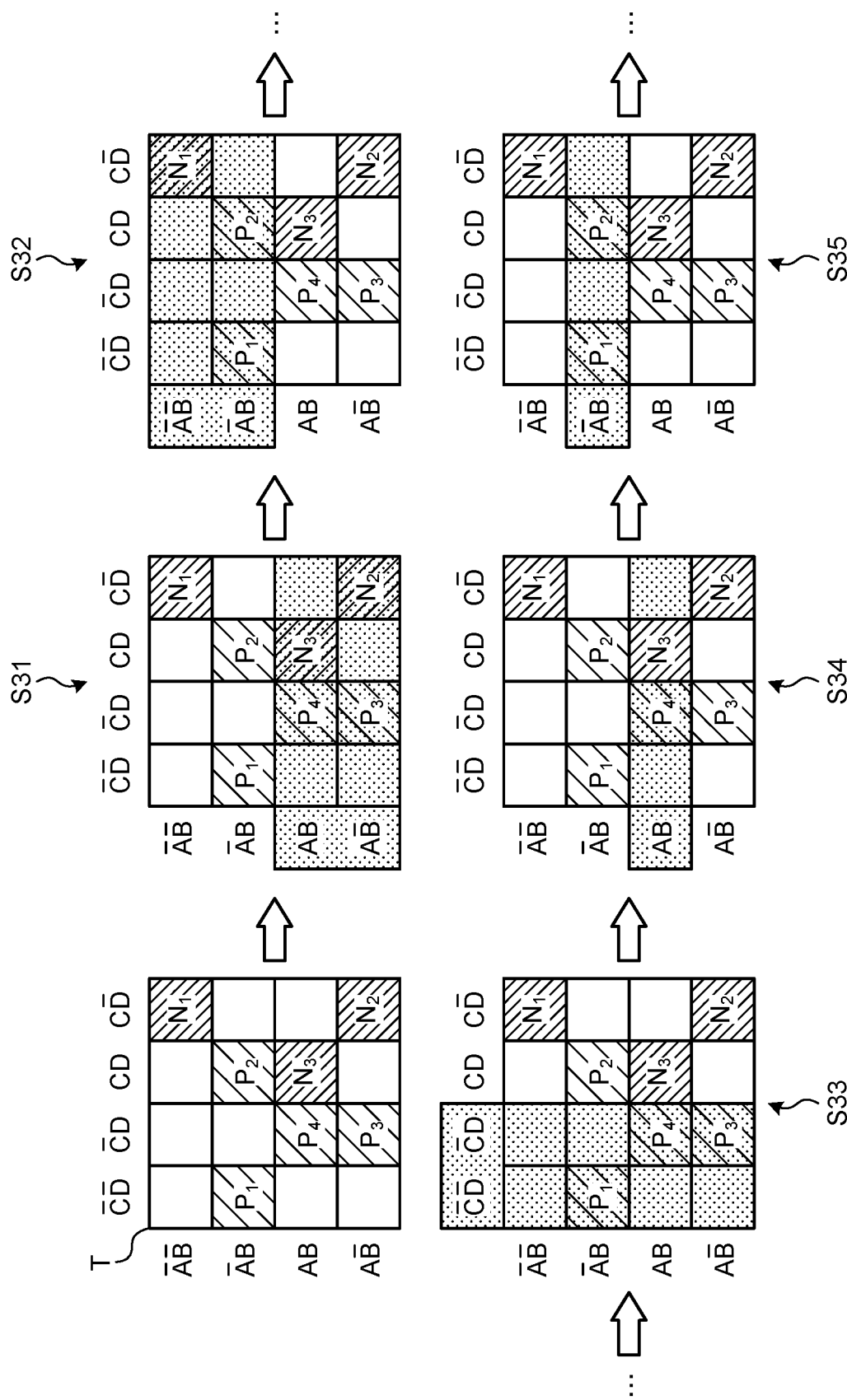
FIG. 6 is an explanatory diagram for explanation of generation of hypotheses.

FIG. 6 is an explanatory diagram for explanation of generation of hypotheses, the explanatory diagram specifically being a diagram for explanation of the content of FIG. 4 and FIG. 5 by use of an example of Karnaugh diagrams. As illustrated in FIG. 6, the hypothesis generating unit 30 performs investigation for a valid combination by changing combinations in order from a combination (S31) of A (with the remaining three explanatory variables being "not used=*"), a combination (S32) of A-bar (with the remaining three explanatory variables being "not used=*", . . . (S31 to S35, . . . ).

The training data sets ($P_1$, $P_3$, and $P_4$) with the objective variable being "+" correspond to the combination (C-bar) at S33. That is, at S33, the number or proportion of the training data sets ($P_1$, $P_3$, and $P_4$) classified into the class "+" is equal to or greater than a predetermined value. Therefore, the combination (C-bar) at S33 is determined as a valid combination (hypothesis) for classification into the class "+". In the following processing, any combination having a literal added to C-bar will be excluded.

Subsequently, the hypothesis generating unit 30 starts investigation for a combination with two explanatory variables being "not used=*" after investigation for all of combinations with three explanatory variables being "not used=*" (S34). The training data sets ($P_1$ and $P_2$) with the objective variable being "+" correspond to the combination (A-bar and B) at S35. That is, at S35, the number or proportion of the training data sets ($P_1$ and $P_2$) classified into the class "+" is equal to or greater than the predetermined value. Therefore, the combination (A-bar and B) at S35 is determined as a valid combination (hypothesis) for classification into the class "+".

Figure 7:
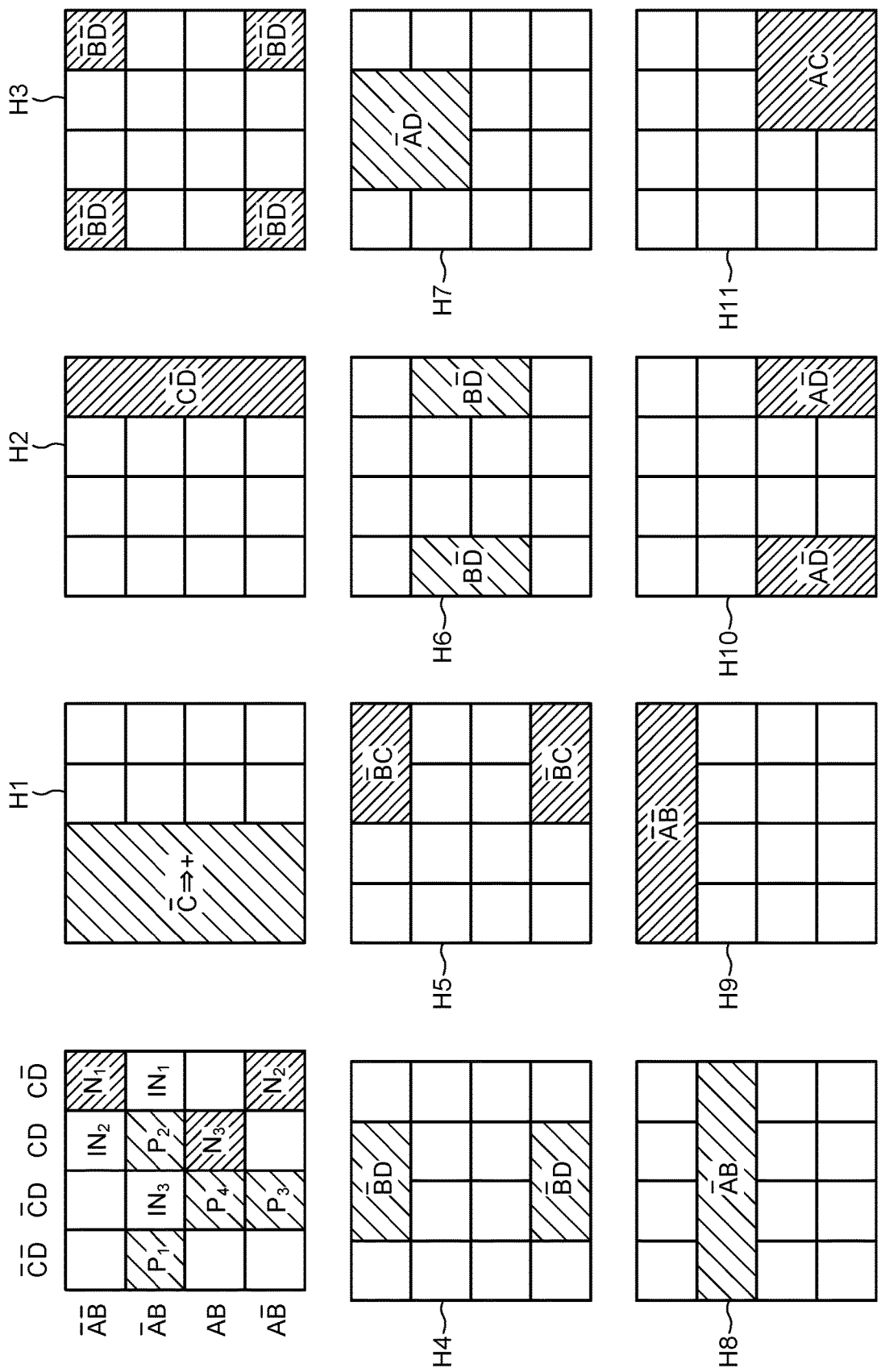
FIG. 7 is an explanatory diagram illustrating an example of hypotheses that have been generated.

FIG. 7 is an explanatory diagram illustrating an example of hypotheses that have been generated. As illustrated in FIG. 7, hypotheses H1 to H11 resulting in classification into "+" or "−" are generated from the training data sets ($P_1$ to $P_4$ and $N_1$ to $N_3$), and stored as the hypothesis set data 23 into the storage unit 20.

Each of these hypotheses H1 to H11 is an independent hypothesis having a prerequisite that the hypothesis correctly explains about classification of the training data sets ($P_1$ to $P_4$ and $N_1$ to $N_3$) into "+" or "−". Therefore, the hypotheses H1 to H11 may include hypotheses contradicting each other, like the hypothesis H2 and hypothesis H6.

Furthermore, for input data sets ($IN_1$, $IN_2$, and $IN_3$) not included in the training data sets ($P_1$ to $P_4$ and $N_1$ to $N_3$), a prediction result is able to be acquired from a matching hypothesis among the hypotheses H1 to H11.

Figure 8:
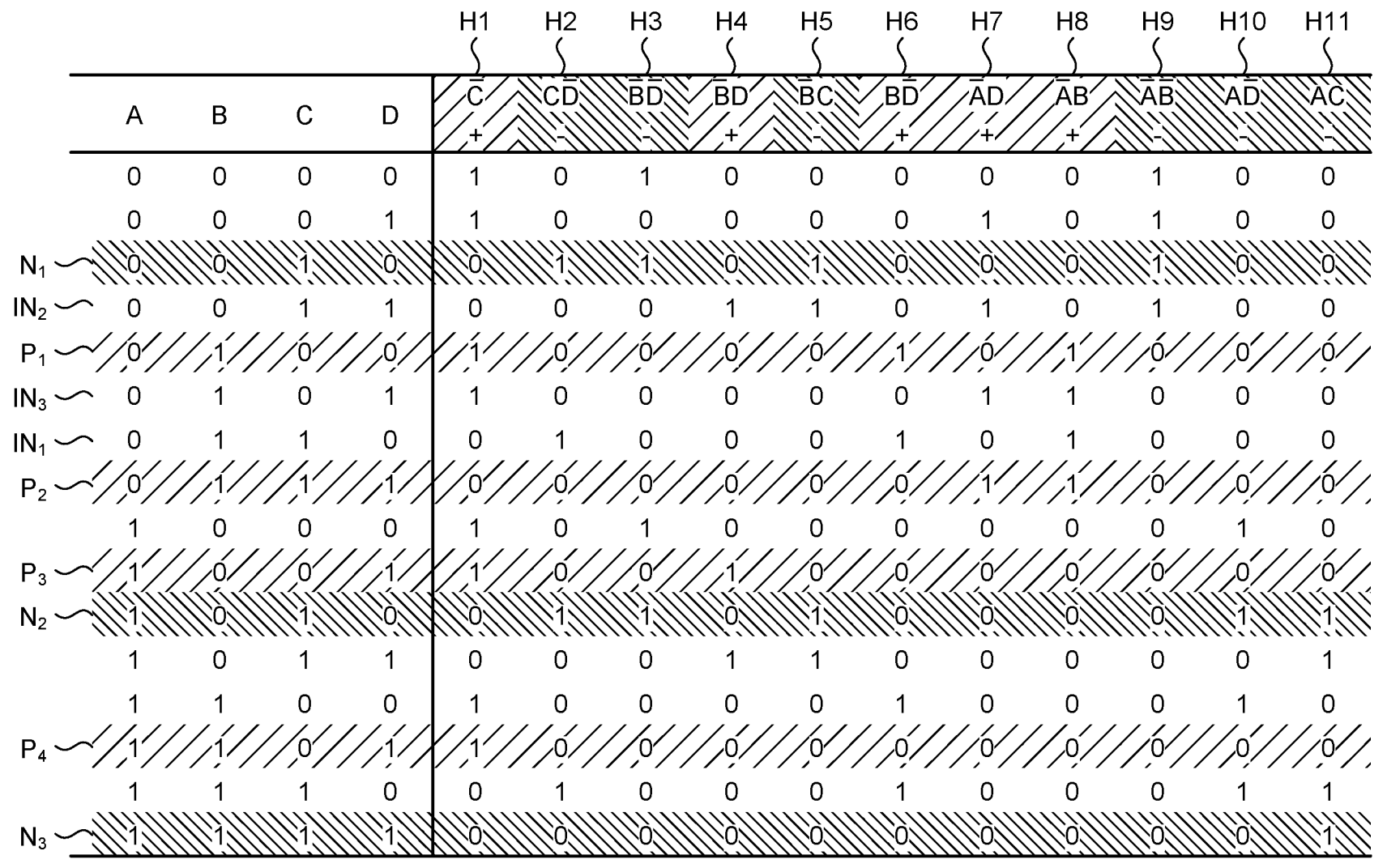

FIG. 8 is an explanatory diagram for explanation of hypotheses matching the input data sets ($IN_1$, $IN_2$, and $IN_3$). As illustrated in FIGS. 8, C and D-bar of the hypothesis H2→−, B and D-bar of the hypothesis H6→+, and A-bar and B of the hypothesis H8→+ are hypotheses matching the input data set $IN_1$. Furthermore, B-bar and D of the hypothesis H4→+, B-bar and C of the hypothesis H5→−, A-bar and D of the hypothesis H7→+, and A-bar and B-bar of the hypothesis H9→− are hypotheses matching the input data set $IN_2$. In addition, C-bar of the hypothesis H1→+, A-bar and D of the hypothesis H7→+, and A-bar and B of the hypothesis H8→+ are hypotheses matching the input data set $IN_3$.

As illustrated in FIG. 2, when there is no combination that has not been selected (S17: Yes), the learning unit 40 calculates, based on whether or not each of the hypotheses (H1 to H11) included in the hypothesis set of the hypothesis set data 23 holds true for each of the training data sets ($P_1$ to $P_4$ and $N_1$ to $N_3$), a weight of each of the hypotheses (H1 to H11) (S18). Subsequently, the learning unit 40 stores results of the calculation as the weight data 24, into the storage unit 20.

Weight calculation in the learning unit 40 may be performed by, for example, any of the following three methods.

In one method, weights of all rules (H1 to H11) are determined to be 1 (a majority decision according to the numbers of the rules).

In another method, weights are according to the numbers of training data sets ($P_1$ to $P_4$ and $N_1$ to $N_3$) supporting (corresponding to) the rules (H1 to H11).

In yet another method, weighting is performed by logistic regression to which the training data sets ($P_1$ to $P_4$ and $N_1$ to $N_3$) are applied.

FIG. 9 is an explanatory diagram for explanation of weighting by logistic regression. In logistic regression, as illustrated in FIG. 9, the training data sets ($P_1$ to $P_4$ and $N_1$ to $N_3$) are applied to a model formula and weights ($\beta_1$ to $\beta_{11}$) related to the hypotheses H1 to H11 are found. This model formula corresponds to a score function for finding a prediction score and is expressed by a pseudo-Boolean function.

The learning unit 40 may perform selection of hypotheses according to the weights of the hypotheses (H1 to H11) acquired by the logistic regression.

Figure 10:
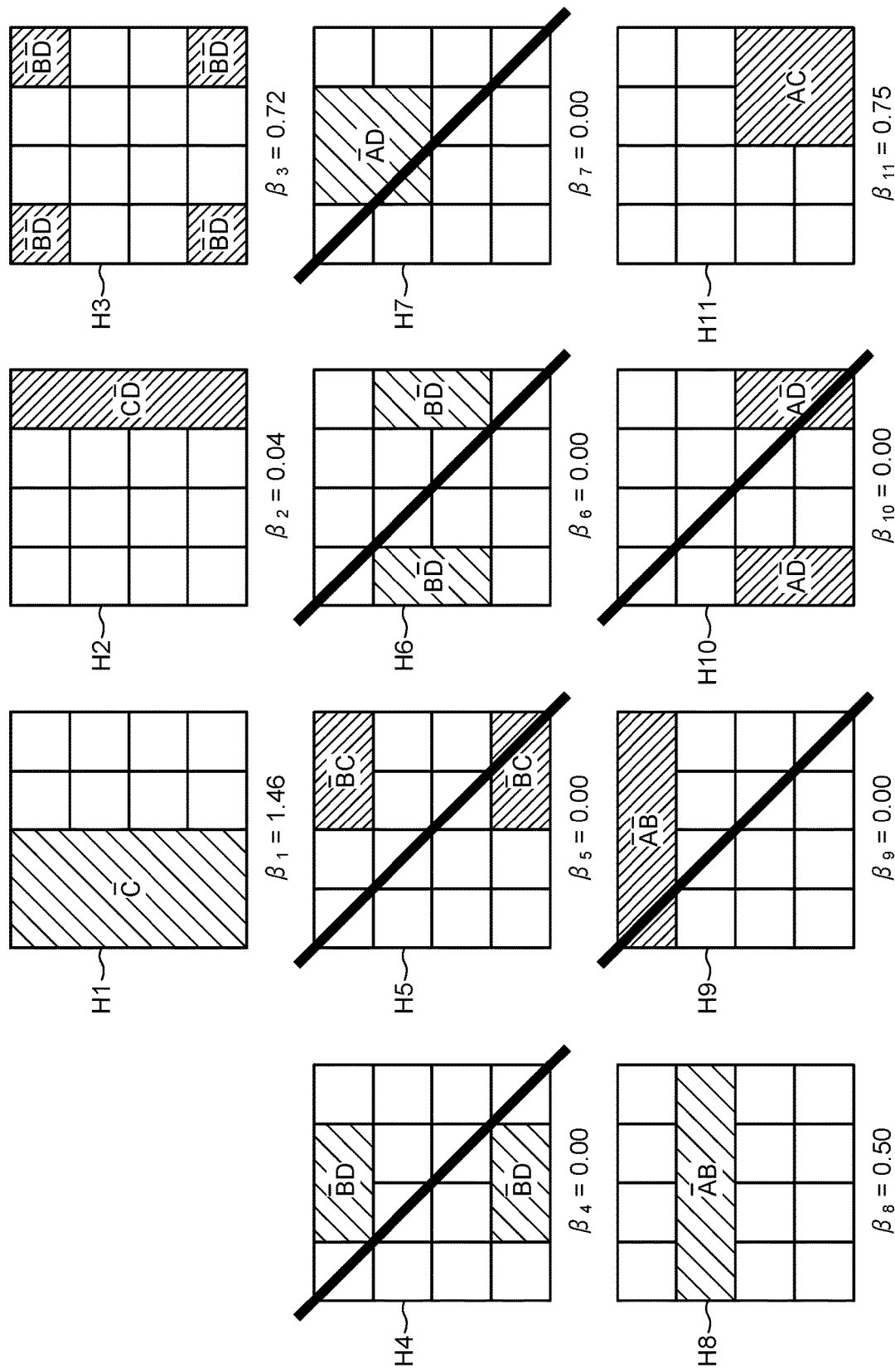
FIG. 10 is an explanatory diagram for selection of hypotheses.

FIG. 10 is an explanatory diagram for explanation of selection of hypotheses. As illustrated in FIG. 10, the learning unit 40 selects, based on the weights ($\beta_1$ to $\beta_{11}$) of the hypotheses H1 to H11, major hypotheses that have weights equal to or greater than a predetermined value and largely influence the result of prediction. In the example illustrated in FIG. 10, the five hypotheses H1 to H3, H8, and H11 of C-bar, C and D-bar, B-bar and D-bar, A-bar and B, and A and C, having weights that are not zero, have been selected as the major hypotheses.

The operation at the time of prediction (S2) will be described by reference to FIG. 2 again. As S2 is started, the input unit 10 receives the input data 22 to be subjected to prediction and stores the input data 22 into the storage unit 20 (S21). Subsequently, the predicting unit 50 executes prediction processing based on the input data 22, by using the fact that the score function of the prediction model is a pseudo-Boolean function, the prediction model corresponding to the hypothesis set according to the hypothesis set data 23 and the weights of the hypotheses according to the weight data 24 (S22). The predicting unit 50 stores the result data 25 representing the prediction result of the prediction processing, into the storage unit 20. Subsequently, by referring to the result data 25, the output unit 60 outputs the prediction result for the input data 22, to a display and/or a file (S23).

Figure 11:
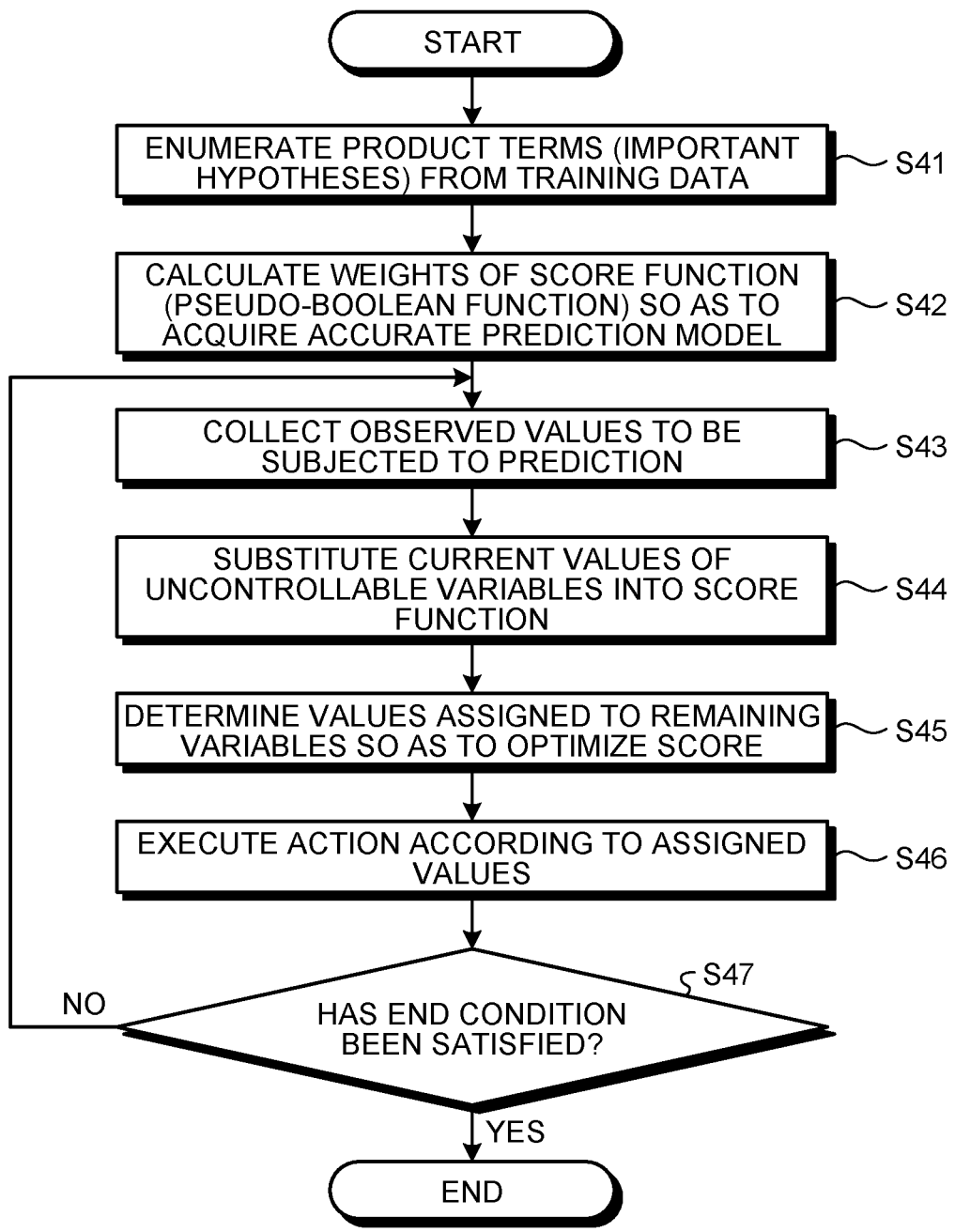
FIG. 11 is a flow chart exemplifying prediction processing where a pseudo-Boolean function is used.

The prediction processing by the predicting unit 50 will be described below in detail. FIG. 11 is a flow chart exemplifying prediction processing where a pseudo-Boolean function is used. The flow chart illustrated in FIG. 11 includes processing (S41 and S42) corresponding to S1 described above, and S43 to S47 correspond to the prediction processing performed by the predicting unit 50.

As illustrated in FIG. 11, as the processing is started, the hypothesis generating unit 30 enumerates product terms (important hypotheses) in a score function from the training data 21 to find a hypothesis set (S41). Subsequently, the learning unit 40 calculates weights of the score function (pseudo-Boolean function), that is, weights of hypotheses included in the hypothesis set, such that a prediction model high in accuracy of determination of whether a product is a non-defective product or a defective product is acquired (S42).

Subsequently, the predicting unit 50 collects observed values (a known action) that have been known for explanatory variables to be subjected to prediction, from the input data 22 (S43). Subsequently, the predicting unit 50 substitutes current values of uncontrollable variables into the score function of the prediction model for finding a score of a label targeted in the input data 22 (S44). Specifically, the predicting unit 50 substitutes observed values (current values) that have been known among the explanatory variables to be subjected to prediction, into the score function.

Subsequently, the predicting unit 50 determines value assignment for the remaining variables (unknown variables among the explanatory variables) so as to optimize the prediction score according to the score function (S45). Specifically, for the remaining variables, the predicting unit 50 determines assignment to the variables by using a findMax function for retrieval of values assigned to the variables (a combination), the values maximizing the prediction score.

FIG. 12 is an explanatory diagram exemplifying an algorithm for a findMax function. The predicting unit 50 retrieves assignment for the remaining variables by executing a findMax function (score function, $-\infty$) having an algorithm as illustrated in FIG. 12, through use of the findMax function, the assignment maximizing the prediction score.

Subsequently, the predicting unit 50 executes an action according to the value assignment to the variables (S46), and determines whether or not a predetermined end condition has been satisfied (S47). If the end condition has not been satisfied (S47: No), the predicting unit 50 returns the processing to S43. If the end condition has been satisfied (S47: Yes), the predicting unit 50 ends the processing.

Figure 13:
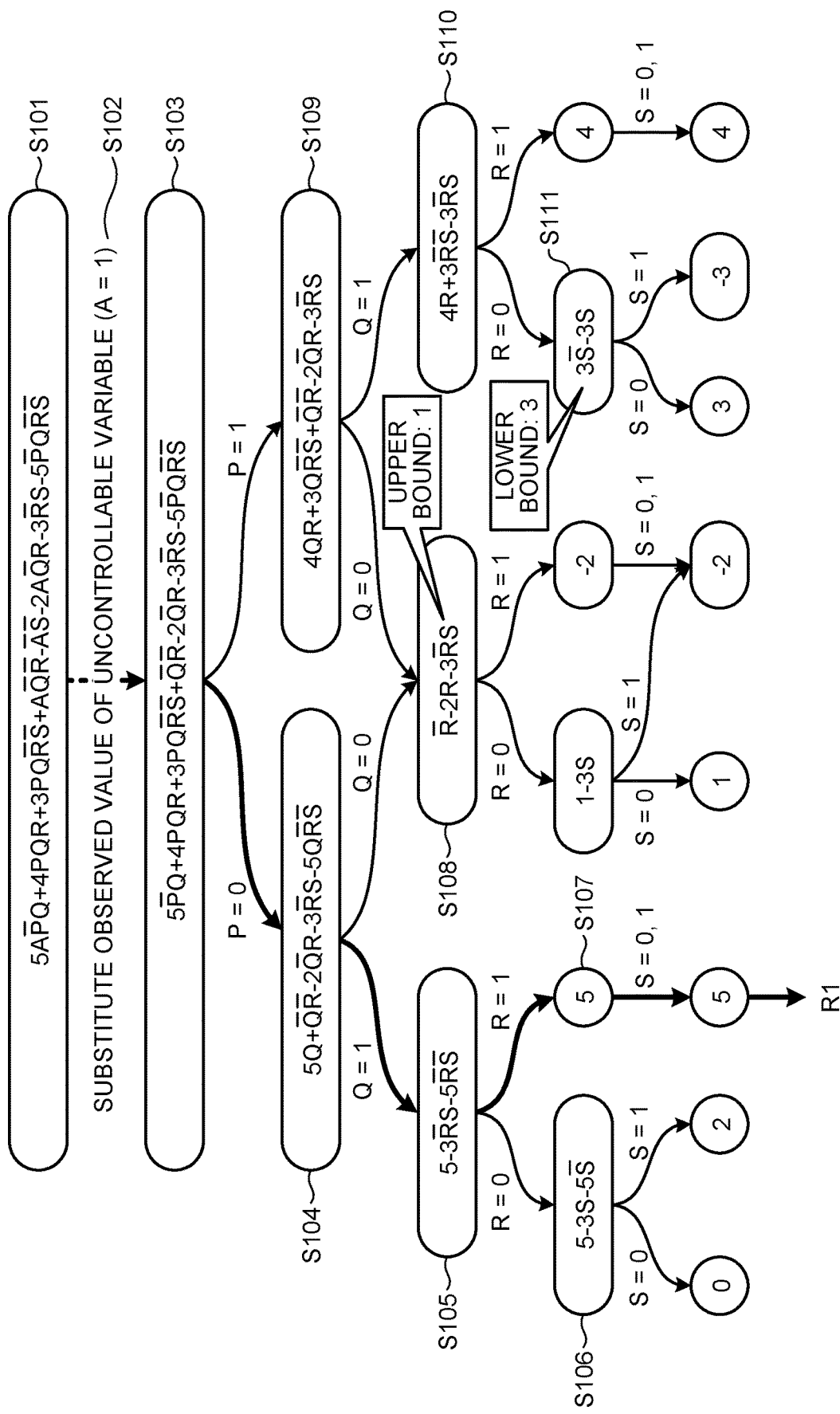
FIG. 13 is an explanatory diagram for explanation of an example of assignment of values to variables.
Figure 14:
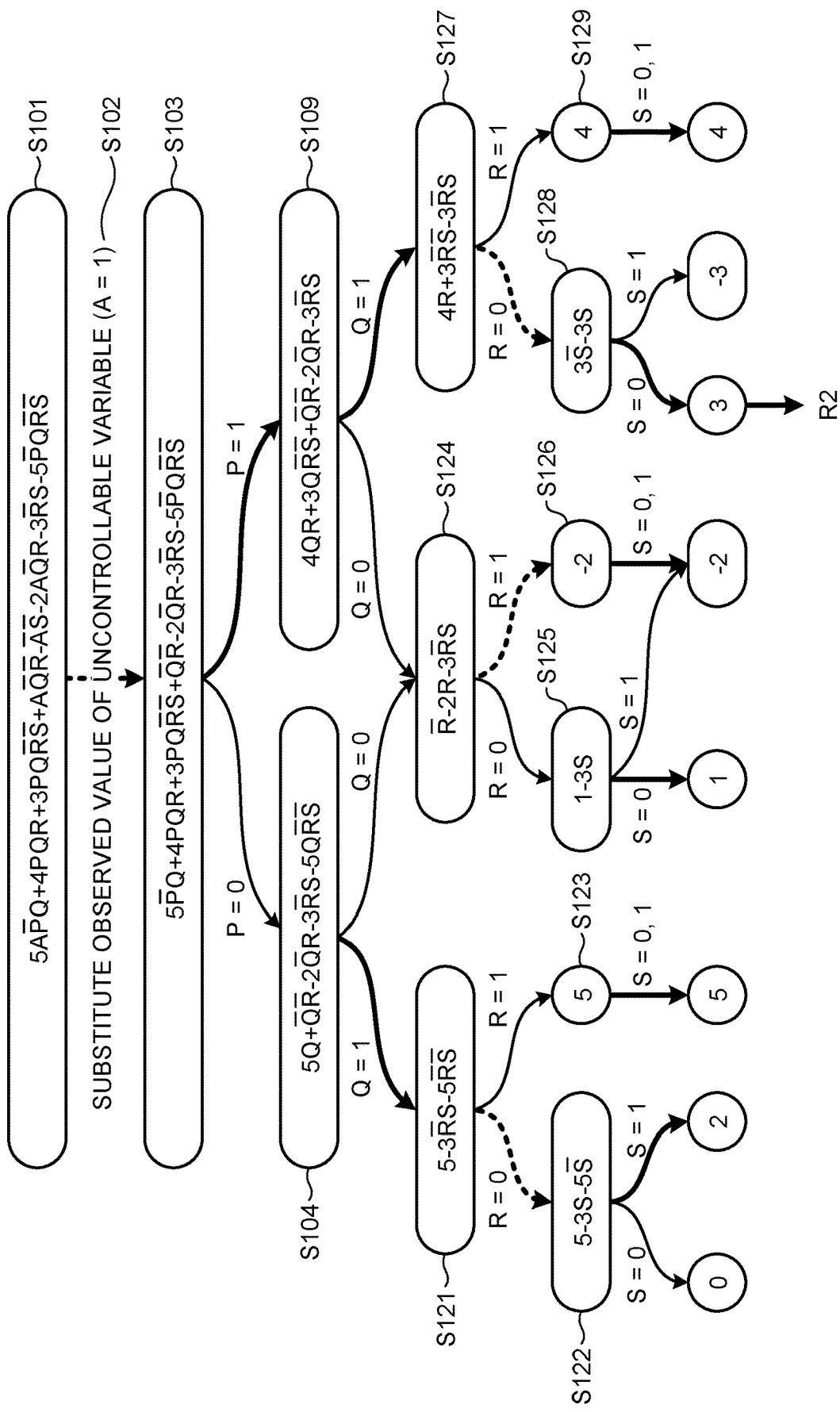
FIG. 14 is an explanatory diagram for explanation of an example of assignment of values to variables.

FIG. 13 and FIG. 14 are explanatory diagrams for explanation of an example of assignment of values to variables In FIG. 13, among variables A, P, Q, R, and S, the variable A is an observed value that is known, and the variables P, Q, R, and S are unknown. In FIG. 14, the variables P, Q, R, and S are unknown, and the variable R is a variable corresponding to an item that is not controlled.

The order corresponding to the order of steps in a manufacturing process (for example, P→Q→R→S) and items that are controlled (controllable) or items that are not controlled (uncontrollable) are assumed to have been set beforehand in the input data 22, for the unknown explanatory variables P, Q, R, and S. An item that is not controlled may be, for example, a control value set by a human in the manufacturing process. Furthermore, an item that is not controlled may be an observed value that has been observed as a state of the process.

As illustrated in FIG. 13, a score function according to the variables A, P, Q, R, and S and weights of these variables is assumed to be as illustrated in S101. Because the variable A is an observed value (A=1) that is known, the predicting unit 50 substitutes the observed value of the uncontrollable variable A into the score function (S102). As a result, the score function as illustrated in S103 is acquired.

Subsequently, the predicting unit 50 sets the variables according to the setting order (P→Q→R→S) and determines assignment of variable values to maximize the prediction score.

For example, the predicting unit 50 acquires a score function related to a state where A=1 and P=0, by substituting P=0 into the score function (S104). Subsequently, the predicting unit 50 acquires a score function related to a state where A=1, P=0, and Q=1, by substituting Q=1 into the score function (S105).

Subsequently, the predicting unit 50 acquires a score function related to a state where A=1, P=0, Q=1, and R=0, by substituting R=0 into the score function (S106). If S=0, the prediction score is found to be 0, and if S=1, the prediction score is found to be 2.

The predicting unit 50 returns to S105 and finds that the prediction score is 5 for a state where A=1, P=0, Q=1, and R=1, by substituting R=1 into the score function (S107). As a result, in the state where A=1, P=0, and Q=1, regardless of the value of S, the prediction score is found to be maximized when R=1.

Subsequently, the predicting unit 50 returns to S104, and by substituting Q=0 into the score function, the predicting unit 50 acquires a score function related to a state where A=1, P=0, and Q=0 (S108). The predicting unit 50 then finds that an upper bound is 1 from a positive term of the score function. Therefore, for the state where A=1, P=0, and Q=0, without retrieval of states of R and S, the score function is found to be lower than that in a state where A=1, P=0, and Q=1.

Subsequently, the predicting unit 50 returns to S103, and by substituting P=1 into the score function, the predicting unit 50 acquires a score function related to a state where A=1 and P=1 (S109). Subsequently, by substituting Q=0 into the score function, the predicting unit 50 acquires a score function related to a state where A=1, P=1, and Q=0. Since this score function is the same as that at S108, for the state where A=1, P=1, and Q=0, without retrieval of states of R and S, the score function is found to be lower than that in the state where A=1, P=0, and Q=1.

Subsequently, the predicting unit 50 returns to S109, and by substituting Q=1 into the score function, the predicting unit 50 acquires a score function related to a state where A=1, P=1, and Q=1 (S110).

Subsequently, by substituting R=0 into the score function, the predicting unit 50 acquires a score function related to a state where A=1, P=1, Q=1, and R=0 (S111). The predicting unit 50 then finds that an upper bound is 3 from a positive term of the score function. Therefore, for the state where A=1, P=1, Q=1, and R=0, without retrieval of a state of S, the score function is found to be lower than that in the state where A=1, P=0, and Q=1.

Subsequently, the predicting unit 50 returns to S110, and by substituting R=1 into the score function, the predicting unit 50 finds that the prediction score is 4 for the state where A=1, P=1, Q=1, and R=1.

By performing the above described processing, the predicting unit 50 finds that the prediction score is maximized by a combination R1 of the variables where A=1, P=0, Q=1, and R=1 (where S is arbitrary).

The predicting unit 50 may determine values estimated to decrease the prediction score, for variables corresponding to items that are not controlled. As a result, the prediction for the other variables is able to be performed with the worst case supposed for the items that are not controlled.

Specifically, as illustrated in FIG. 14, after acquiring a score function related to a state where A=1, P=0, and Q=1 (S121), the predicting unit 50 sets values for the variable R (an item that is not controlled) subsequent to the variable Q to find prediction scores (S122 and S123).

The predicting unit 50 sets a value estimated to decrease the prediction score as the value of the variable R. For example, if R=0, the prediction score is 0 or 2, and if R=1, the prediction score is 5 regardless of S. Therefore, the variable R is set to R=0 that is estimated to decrease the prediction score. Since a value that maximizes the prediction score is set for the variable S, S=1.

Similarly, after acquiring a score function related to a state where A=1, P=0, and Q=0 (S124), the predicting unit 50 sets values for the variable R (an item that is not controlled) subsequent to the variable Q to find prediction scores (S125 and S126). Furthermore, after acquiring a score function related to a state where A=1, P=1, and Q=1 (S127), the predicting unit 50 sets values for the variable R (an item that is not controlled) subsequent to the variable Q to find prediction scores (S128 and S129).

As described above, the predicting unit 50 searches for assignment to the variables by: determining a value estimated to decrease the prediction score for the variable R; and thereafter determining a value for the remaining variable to maximize the prediction score. As a result, the predicting unit 50 acquires a combination R2 of the variables where A=1, P=1, Q=1, R=0, and S=0.

The predicting unit 50 may determine values for variables corresponding to items that are not controlled, so as to increase the expected value of the prediction score. Specifically, the predicting unit 50 fixes a weight of any product term including an unknown and uncontrollable variable to 0 to recalculate weights in the score function. Subsequently, the predicting unit 50 selects values for unknown and controllable variables (for example, the variables P, Q, and S) so as to maximize the new score function. Next, the predicting unit 50 sequentially executes actions as long as the next variable is a controllable variable (for example, the variable P or Q). Furthermore, the predicting unit 50 waits for a value of a variable to be definite as long as the next variable is an uncontrollable variable. The predicting unit 50 thereafter retrieves a combination of variables by repeating the above described processing.

Figure 15:
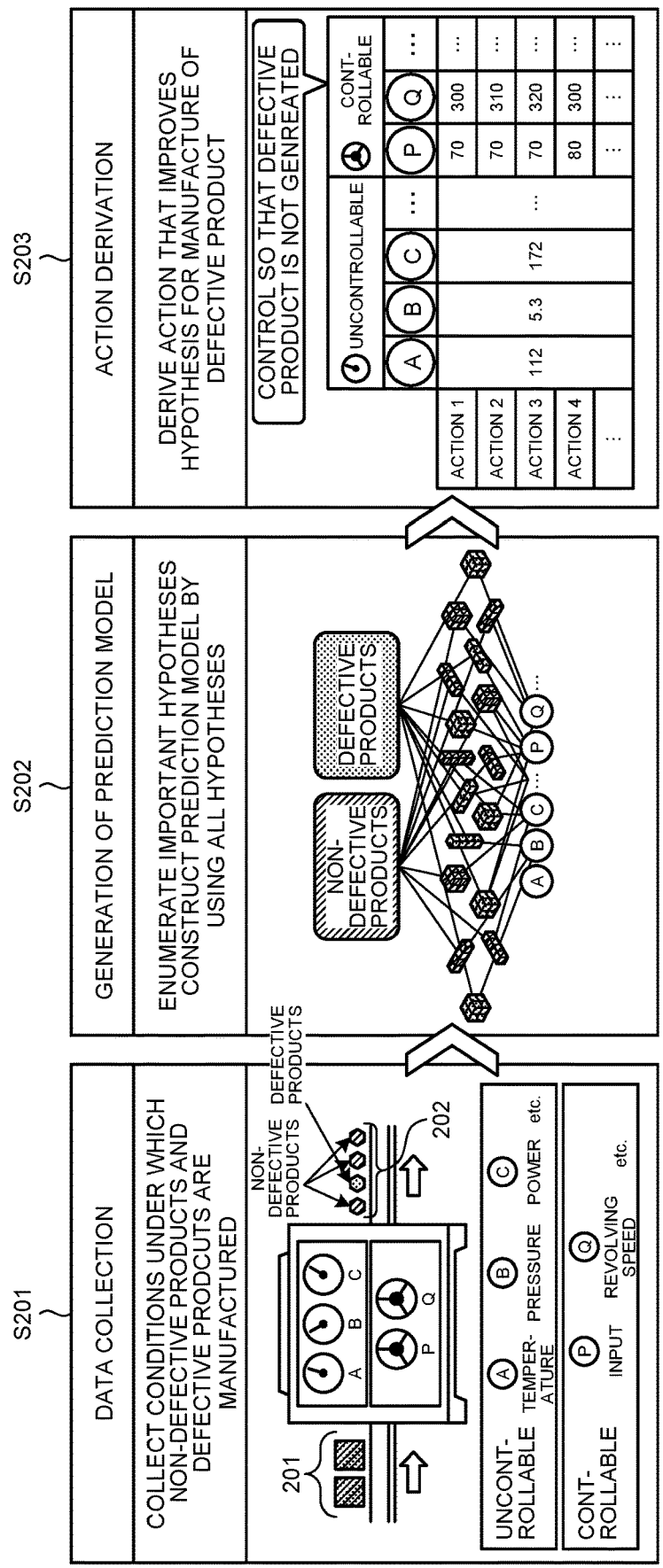
FIG. 15 is an explanatory diagram for explanation of an example of application of prediction processing.

FIG. 15 is an explanatory diagram for explanation of an example of application of prediction processing. As illustrated in FIG. 15, in data collection (S201), conditions under which non-defective products and defective products are manufactured in a manufacturing process for manufacture of manufactured products 202 from raw materials 201, that is, the training data 21, are collected. Specifically, conditions of uncontrollable items, such as temperature (A), pressure (B), and electric power (C) at each step and controllable items, such as input (P) and revolving speed (Q), are collected.

Subsequently, based on the training data 21, the information processing apparatus 1 generates a hypothesis set having important hypotheses (product terms) enumerated therein. The information processing apparatus 1 then generates a prediction model for prediction of whether a manufactured product is a non-defective product or a defective product by using all of the hypotheses therein (S202).

Subsequently, based on the input data 22 including a known action (a part of explanatory variables) and a label targeted (an objective variable), the information processing apparatus 1 performs prediction of an optimum action (action derivation) resulting in the label targeted after the known action (S203).

For example, by predicting an action that maximizes the prediction score for a prediction model for a case where a non-defective product is manufactured, the information processing apparatus 1 is able to derive an action for manufacture of a non-defective product. Furthermore, by predicting an action that minimizes the prediction score for a prediction model for a case where a defective product is manufactured, the information processing apparatus 1 is able to derive an action that improves a hypothesis for manufacture of a defective product.

As described above, the information processing apparatus 1 has the input unit 10 and the predicting unit 50. The input unit 10 receives the input data 22 to be subjected to prediction. The predicting unit 50 generates a prediction result using the input data 22, by using respective weights of plural hypotheses included in a hypothesis set, the weights having been learnt by the learning unit 40 based on whether or not each of the plural hypotheses holds true. Furthermore, the predicting unit 50 determines variables included in a pseudo-Boolean function such that a probability that the prediction result using the input data 22 satisfies a specific condition fulfills a predetermined standard, the probability being calculated by the pseudo-Boolean function, the pseudo-Boolean function being generated as a result of machine learning, the pseudo-Boolean function including variables corresponding to explanatory variables, the pseudo-Boolean function being used in calculation of a probability that the specific condition is satisfied.

With a general black box prediction model, retrieval enabling the prediction score to be maximized is performed by attempt of all actions one by one. On the contrary, the information processing apparatus 1 uses the fact that a prediction score is expressed by a pseudo-Boolean function. Therefore, the information processing apparatus 1 is able to efficiently perform prediction due to advantages of pseudo-Boolean functions, the advantages including that determination of an equivalent state is possible, calculation of a lower bound and an upper bound is facilitated, and the existing technique related to pseudo-Boolean functions is applicable.

Furthermore, the predicting unit 50 substitute values included in the input data 22 into values of predetermined variables among values of variables included in a pseudo-Boolean function and thereafter determines values of the remaining variables included in the pseudo-Boolean function. As a result, the information processing apparatus 1 is able to sequentially find values of variables related to undetermined items after substituting observed values into the pseudo-Boolean function for items for which the observes values have been acquired in the input data 22.

Furthermore, the predicting unit 50 sets values in predetermined order for values of the remaining variables included in the pseudo-Boolean function to determine a combination of values of variables, the combination maximizing the probability. As described above, because the information processing apparatus 1 retrieves a combination of values of variables for variables of a pseudo-Boolean function, the combination maximizing the probability, the retrieval having ordering; when, for example, an upper bound and a lower bound have been estimated, estimation for the variables thereafter is able to be omitted.

Furthermore, the predicting unit 50 determines values estimated to decrease the probability, for values of variables corresponding to items that are not controlled, among values of the remaining variables included in the pseudo-Boolean function. As a result, the information processing apparatus 1 is able to perform prediction for the remaining variables after supposing a worsening case beforehand for items that are not controlled, the worsening case being where the probability becomes small.

The components of the apparatus illustrated in the drawings are not necessarily configured physically as illustrated therein. That is, specific forms of separation and integration of the apparatus are not limited only to the one illustrated in the drawings, and all or a part of the apparatus may be configured to be functionally or physically separated or integrated in arbitrary units according to various loads and use situations.

All or any part of the various processing functions performed by the information processing apparatus 1 may be executed on a CPU (or a microcomputer, such as an MPU, or a microcontroller unit (MCU)). Furthermore, all or any part of the various processing functions may be executed on a program analyzed and executed by a CPU (or a microcomputer, such as an MPU or an MCU), or on hardware by wired logic, needless to say. In addition, the various processing functions implemented in the information processing apparatus 1 may be executed by plural computers in cooperation with one another through cloud computing.

Figure 16:
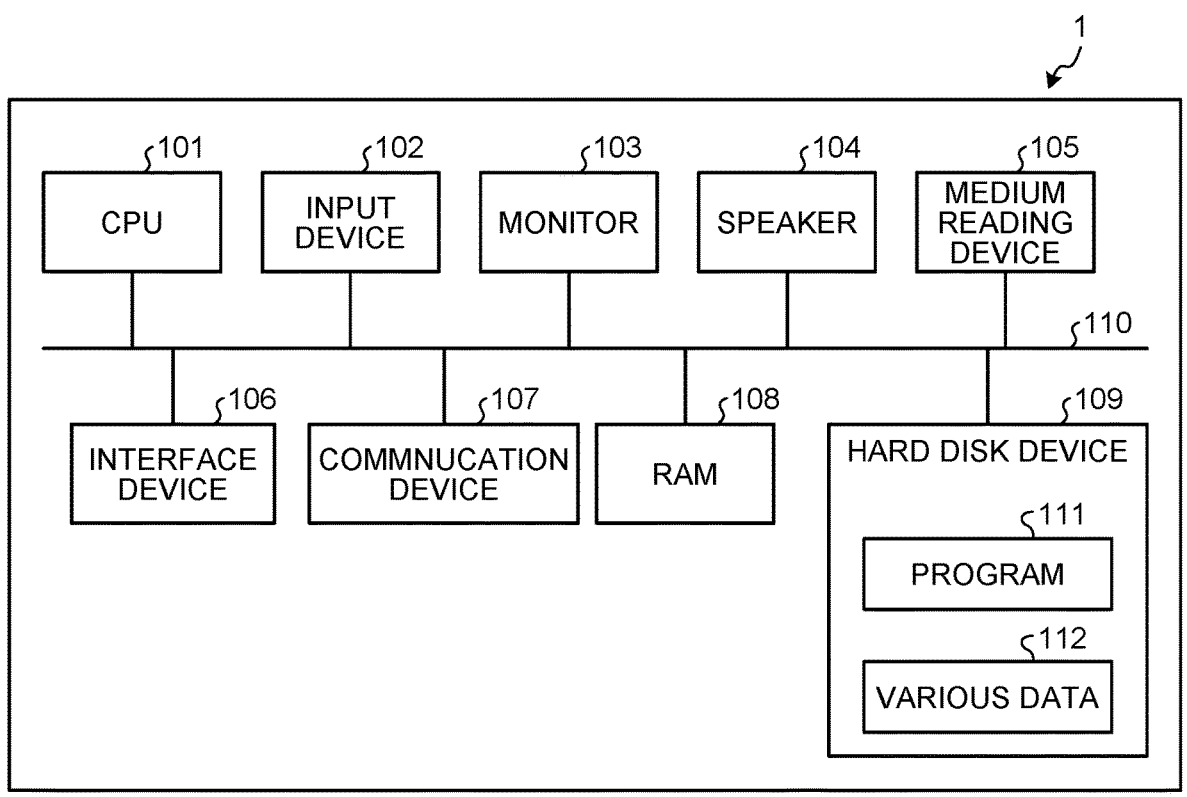
FIG. 16 is an explanatory diagram for explanation of an example a hardware configuration of the information processing apparatus according to the embodiment.

The various types of processing described with respect to the above embodiment may be implemented by a program being executed by a computer, the program having been prepared beforehand. Accordingly, an example of a computer (hardware) that executes a program having functions that are the same as those of the above described embodiment will be described below. FIG. 16 is an explanatory diagram for explanation of an example of a hardware configuration of the information processing apparatus 1 according to the embodiment.

As illustrated in FIG. 16, the information processing apparatus 1 has a CPU 101 that executes various types of arithmetic processing, an input device 102 that receives input of data, a monitor 103, and a speaker 104. Furthermore, the information processing apparatus 1 has a medium reading device 105 that reads the program from a storage medium, an interface device 106 for connection to various devices, and a communication device 107 for communicative connection to an external device wiredly or wirelessly. In addition, the information processing apparatus 1 has a RAM 108 that temporarily stores therein various types of information, and a hard disk device 109. Furthermore, these units (101 to 109) in the information processing apparatus 1 are connected to a bus 110.

The hard disk device 109 has, stored therein, a program 111 for execution of the various types of processing described with respect to the embodiment above. Furthermore, the hard disk device 109 has, stored therein, various data 112 (for example, the training data 21, input data 22, hypothesis set data 22, weight data 24, and result data 25) referred to by the program 111. The input device 102 receives, for example, input of operating information from an operator of the information processing apparatus 1. The monitor 103 displays thereon, for example, various screens operated by the operator. The interface device 106 has, for example, a printing device connected thereto. The communication device 107 is connected to a communication network, such as a local area network (LAN), and exchanges various types of information with the external device via the communication network.

The CPU 101 performs various types of processing related to the input unit 10, the hypothesis generating unit 30, the learning unit 40, the predicting unit 50, and the output unit 60, by reading the program 111 stored in the hard disk device 109 and loading the program 111 into the RAM 108 to execute the program 111. The program 111 may be not stored in the hard disk device 109. For example, the program 111 that has been stored in a storage medium readable by the information processing apparatus 1 may be read and executed by the information processing apparatus 1. The storage medium readable by the information processing apparatus 1 corresponds to, for example: a portable recording medium, such as a CD-ROM, a DVD disk, or a universal serial bus (USB) memory; a semiconductor memory, such as a flash memory; or a hard disk drive. Furthermore, the program 111 may be stored beforehand in a device connected to a public line, the Internet, or a LAN, and the information processing apparatus 1 may read the program 111 from the device and execute the program 111.

According to an aspect, prediction for input data is able to be performed efficiently.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein a predicting program that causes a computer to execute a process comprising:
   receiving input data to be subjected to prediction; and
   generating, from training data sets each having explanatory variables and an objective variable, a prediction result using the input data, by using a hypothesis set and respective weights of a plurality of hypotheses included in the hypothesis set, the hypothesis set including the hypotheses each being formed of a combination of the explanatory variables, classifying any of the training data sets and satisfying a specific condition, the weights being obtained by machine learning based on whether or not each of the hypotheses included in the hypothesis set holds true for each of the training data sets, wherein the generating includes determining a value of a variable included in a pseudo-Boolean function such that a probability satisfies a predetermined standard, the probability being a probability that the prediction result using the input data satisfies the specific condition, the probability being calculated by the pseudo-Boolean function generated as a result of the machine learning, the pseudo-Boolean function including variables corresponding to the explanatory variables and used in calculation of a probability that the specific condition is satisfied.

2. The non-transitory computer-readable recording medium according to claim 1, wherein the generating includes determining a value of a remaining variable included in the pseudo-Boolean function after substituting a value included in the input data into a value of a predetermined variable among values of variables included in the pseudo-Boolean function.

3. The non-transitory computer-readable recording medium according to claim 2, wherein the generating includes setting values in predetermined order for values of remaining variables included in the pseudo-Boolean function to determine a combination of the values of the remaining variables that maximizes the probability.

4. The non-transitory computer-readable recording medium according to claim 3, wherein the generating includes determining a value estimated to decrease the probability, for a value of a variable corresponding to an uncontrolled item among the values of the remaining variables included in the pseudo-Boolean function.

5. A predicting method comprising:

receiving input data to be subjected to prediction; and generating, from training data sets each having explanatory variables and an objective variable, a prediction result using the input data, by using a hypothesis set and respective weights of a plurality of hypotheses included in the hypothesis set, the hypothesis set including the hypotheses each being formed of a combination of the explanatory variables, classifying any of the training data sets and satisfying a specific condition, the weights being obtained by machine learning based on whether or not each of the hypotheses included in the hypothesis set holds true for each of the training data sets, by a processor, wherein the generating includes determining a value of a variable included in a pseudo-Boolean function such that a probability satisfies a predetermined standard, the probability being a probability that the prediction result using the input data satisfies the specific condition, the probability being calculated by the pseudo-Boolean function generated as a result of the machine learning, the pseudo-Boolean function including variables corresponding to the explanatory variables and used in calculation of a probability that the specific condition is satisfied.

6. The predicting method according to claim 5, wherein the generating includes determining a value of a remaining variable included in the pseudo-Boolean function after substituting a value included in the input data into a value of a predetermined variable among values of variables included in the pseudo-Boolean function.

7. The predicting method according to claim 6, wherein the generating includes setting values in predetermined order for values of remaining variables included in the pseudo-Boolean function to determine a combination of the values of the remaining variables that maximizes the probability.

8. The predicting method according to claim 7, wherein the generating includes determining a value estimated to decrease the probability, for a value of a variable corresponding to an uncontrolled item among the values of the remaining variables included in the pseudo-Boolean function.

9. A predicting apparatus comprising:

an input unit that receives input data to be subjected to prediction; and a processor that is configured to generate, from training data sets each having explanatory variables and an objective variable, a prediction result using the input data, by using a hypothesis set and respective weights of a plurality of hypotheses included in the hypothesis set, the hypothesis set including the hypotheses each being formed of a combination of the explanatory variables, classifying any of the training data sets and satisfying a specific condition, the weights being obtained by machine learning based on whether or not each of the hypotheses included in the hypothesis set holds true for each of the training data sets, wherein the processor determines a value of a variable included in a pseudo-Boolean function such that a probability satisfies a predetermined standard, the probability being a probability that the prediction result using the input data satisfies the specific condition, the probability being calculated by the pseudo-Boolean function generated as a result of the machine learning, the pseudo-Boolean function including variables corresponding to the explanatory variables and used in calculation of a probability that the specific condition is satisfied.

10. The predicting apparatus according to claim 9, wherein the processor determines a value of a remaining variable included in the pseudo-Boolean function after substituting a value included in the input data into a value of a predetermined variable among values of variables included in the pseudo-Boolean function.

11. The predicting apparatus according to claim 10, wherein the processor sets values in predetermined order for values of remaining variables included in the pseudo-Boolean function and determines a combination of the values of the remaining variables that maximizes the probability.

12. The predicting apparatus according to claim 11, wherein the processor determines a value estimated to decrease the probability, for a value of a variable corresponding to an uncontrolled item, the value being among the values of the remaining variables included in the pseudo-Boolean function.

* * * * *